(No Model.)
G. F. SCHNEIDER.
FOLDING LUNCH BOX.
No. 313,538. Patented Mar. 10, 1885.
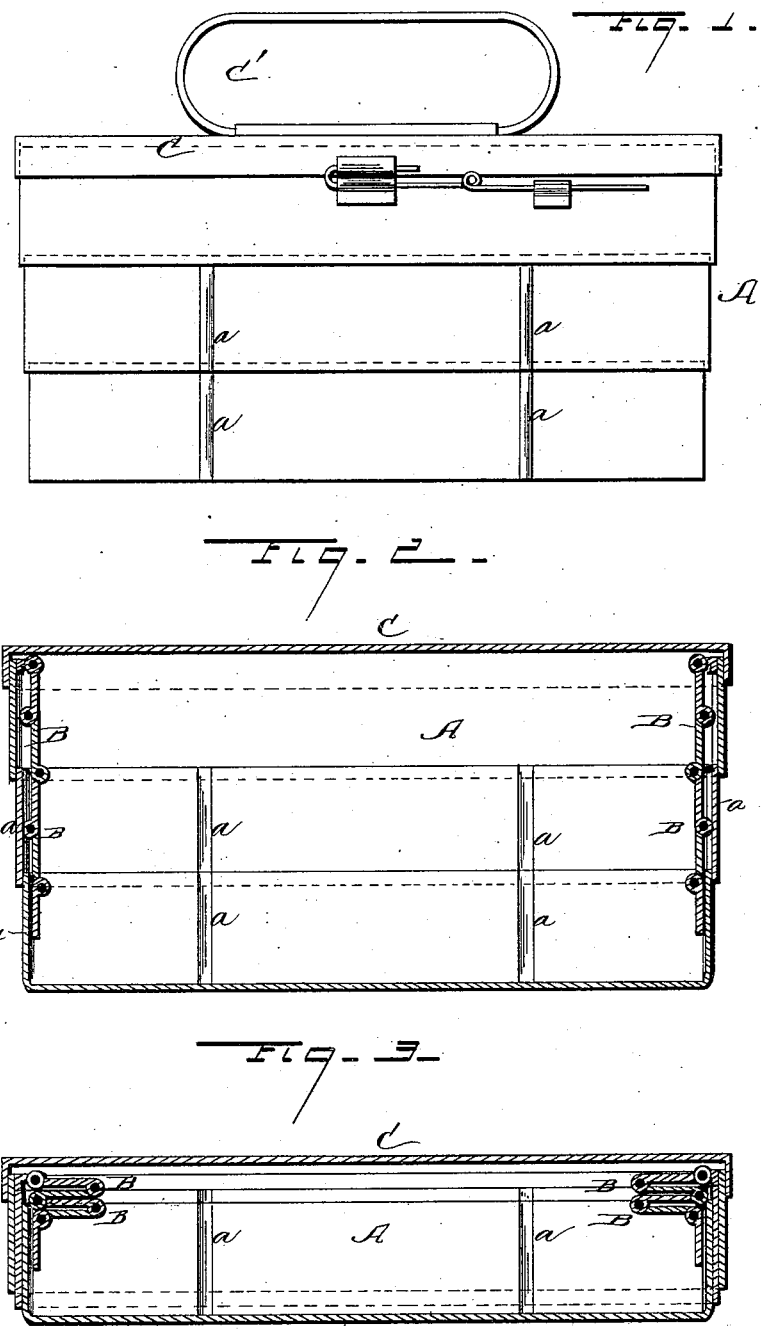

UNITED STATES PATENT OFFICE.

GEORGE F. SCHNEIDER, OF CHICAGO, ILLINOIS.

FOLDING LUNCH-BOX.

SPECIFICATION forming part of Letters Patent No. 313,538, dated March 10, 1885.

Application filed April 26, 1884. (No model.)

*To all whom it may concern:*

Be it known that I, GEORGE F. SCHNEIDER, a citizen of the United States, residing at Chicago, in the county of Cook and State of Illinois, have invented certain new and useful Improvements in Folding Lunch-Boxes, of which the following is a specification, to wit:

This invention relates to folding lunch-boxes; and it consists in certain peculiarities of the construction and arrangement of the same, substantially as will be hereinafter more fully set forth and claimed.

In order to enable others skilled in the art to which my invention appertains to make and use the same, I will now proceed to describe its construction and operation, referring to the accompanying drawings, in which—

Figure 1 is a side elevation; Fig. 2, a longitudinal section of the box in an extended position, and Fig. 3 a similar view folded.

A represents the box, which is made in two or more sections, telescoping vertically one within the other, as seen in the drawings. The sides and ends of these sections are each formed with a raised rib, $a$, struck up from the main body of the section, upon which the next section slides, and thereby protects the japan or paint from being rubbed or scratched. The sections are connected upon the inside by hinges B, the sections of which are hinged together at their centers, and the ends of each section of the hinged braces are connected by hinge-joints to two adjoining sections of the box, as fully shown in Fig. 2. To the upper section is hinged a suitable lid or cover, C, having a handle, C', for carrying the box.

When wanted for use, the telescope-sections of the box are drawn out, and when the hinges B are extended it will be seen that they are pressed past a direct line through their ends, and are thereby prevented from being folded by any pressure on the box, while it is easy at any time to fold the hinges inward, and thereby allow the box to collapse, when it is small enough to be placed in the pocket for convenience of carrying. The ribbed sides of the sections effectually prevent the paint from being injured in folding or unfolding the box, and the sides and ends of the box, not being hinged together, are always rigid and preserve their shape at all times.

Having thus fully described my invention, what I claim as new, and desire to secure by Letters Patent, is—

1. The combination, with a folding lunch-box constructed in several telescoping sections, of a series of jointed braces hinged together at their center joints, and having their ends also hinged to the adjoining sections of the box, whereby the box is held rigidly in position when extended and readily folded when desired, substantially as described, and for the purpose set forth.

2. A lunch-box formed in sections telescoping one within the other, each of which is provided with raised ribs, which prevent the main body of the sections from contact, and thereby protects the paint, substantially as shown and described.

3. The box A, formed in several telescoping sections provided with the ribs $a\ a$, and lid C, in combination with the hinges B, jointed at their center and hinged to the sections at their ends, substantially as shown and described.

In testimony whereof I affix my signature in presence of two witnesses.

GEORGE F. SCHNEIDER.

Witnesses:
W. C. MCARTHUR,
CHAS. KRESSMANN.